US012493138B2

(12) United States Patent
Chen et al.

(10) Patent No.: US 12,493,138 B2
(45) Date of Patent: Dec. 9, 2025

(54) AIRGAP STRUCTURES FOR IMPROVED EYEPIECE EFFICIENCY

(71) Applicant: Applied Materials, Inc., Santa Clara, CA (US)

(72) Inventors: Erica Chen, Cupertino, CA (US); Kang Luo, Santa Clara, CA (US); Hao Tang, San Jose, CA (US); Jinrui Guo, San Jose, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 831 days.

(21) Appl. No.: 17/654,860

(22) Filed: Mar. 15, 2022

(65) Prior Publication Data
US 2022/0299677 A1 Sep. 22, 2022

Related U.S. Application Data

(60) Provisional application No. 63/162,459, filed on Mar. 17, 2021.

(51) Int. Cl.
*G02B 1/00* (2006.01)
*G02B 1/11* (2015.01)
*G02B 5/18* (2006.01)

(52) U.S. Cl.
CPC ............... *G02B 1/002* (2013.01); *G02B 1/11* (2013.01); *G02B 5/1842* (2013.01)

(58) Field of Classification Search
CPC . G02B 1/002; G02B 1/04; G02B 1/08; G02B 1/10; G02B 1/11; G02B 1/111;
(Continued)

(56) References Cited

U.S. PATENT DOCUMENTS

2001/0006324 A1 7/2001 Araki et al.
2016/0099167 A1* 4/2016 Kim et al. ........ H01L 21/02312
438/422
(Continued)

FOREIGN PATENT DOCUMENTS

JP 2004154716 A * 6/2004
KR 1020200075893 A 6/2020
WO 2016205249 A1 12/2016

OTHER PUBLICATIONS

International Search Report/Written Opinion issued to PCT/US2022/020399 on Jun. 29, 2022.

*Primary Examiner* — Stephone B Allen
*Assistant Examiner* — Wai-Ga D Ho
(74) *Attorney, Agent, or Firm* — Patterson + Sheridan, LLP; B. Todd Patterson

(57) ABSTRACT

Embodiments of the present disclosure generally relate to encapsulated optical devices and methods of forming encapsulated optical devices. The optical devices include a plurality of optical device structures disposed on a substrate. An encapsulation coating is disposed over the plurality of optical device structures. The encapsulation coating includes a ratio of encapsulation material to solvent. A plurality of gaps are formed in the optical device. The plurality of gaps are formed when the solvent is evaporated from the encapsulation coating. The material composition of the encapsulation coating, the width and device angle of the plurality of optical device structures, as well as process parameters of the spin on coating process, the curing process, the baking process, the drying process, and the developing process will affect the formation of the plurality of gaps and the depth at which the plurality of gaps are formed.

20 Claims, 3 Drawing Sheets

(58) Field of Classification Search
CPC .......... G02B 1/113; G02B 1/115; G02B 1/12;
G02B 1/14; G02B 5/1819; G02B 5/1842;
G02B 5/1847; G02B 5/1866; G02B
27/0081; G02B 2027/0174; G02B 6/4239;
B29D 11/00; B01D 63/0225; B81B
7/0032
See application file for complete search history.

(56) References Cited

U.S. PATENT DOCUMENTS

| | | |
|---|---|---|
| 2018/0217395 A1 | 8/2018 | Lin et al. |
| 2020/0209483 A1* | 7/2020 | Mohanty .............. G02B 5/1847 |
| 2020/0319384 A1 | 10/2020 | Pavelka et al. |
| 2022/0011471 A1* | 1/2022 | Doshay et al. .......... G02B 3/08 |
| 2024/0130163 A1* | 4/2024 | Yamazaki et al. ..... H10K 39/34 |
| 2024/0151971 A1* | 5/2024 | Vora et al. ........... G02B 5/1852 |

* cited by examiner

AIRGAP STRUCTURES FOR IMPROVED EYEPIECE EFFICIENCY

CROSS-REFERENCE TO RELATED APPLICATIONS

This application claims benefit of U.S. Provisional Patent Application No. 63/162,459, filed Mar. 17, 2021, which is herein incorporated by reference in its entirety.

BACKGROUND

Field

Embodiments of the present disclosure generally relate to optical devices. More specifically, embodiments described herein relate to encapsulated optical devices and methods of forming encapsulated optical devices.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Optical devices including waveguide combiners, such as augmented reality waveguide combiners, and flat optical devices, such as metasurfaces, are used to assist in overlaying images. Generated light is propagated through an optical device until the light exits the optical device and is overlaid on the ambient environment. The optical device structures of the optical devices need encapsulation to serve as a protective layer, to function as a spacer layer between successive layers of a multilayer arrangement, and to maximize light transmission. Furthermore, a greater difference between the refractive index of the material of the structures and the refractive index of the air in the gaps between the structures is vital to achieve desired optical device performance and efficiency. Air, having a refractive index of about 1.0, between each of the structures is desired to achieve the greater difference of refractive indices. Currently, fabricating air gaps inside optical devices requires decomposition of materials coupled with additional encapsulation steps.

Accordingly, what is needed in the art are encapsulated optical devices and methods of forming encapsulated optical devices.

SUMMARY

In one embodiment, a device is provided. The device includes a plurality of optical device structures disposed in or on a first substrate. The device further includes an encapsulation coating disposed over the plurality of optical device structures. The encapsulation coating includes a ratio of an encapsulation material to a solvent of about 1:10 to about 1:1.

In another embodiment, an optical device is provided. The optical device is formed with a method. The method includes disposing an encapsulation coating over a substrate, over a plurality of optical device structures, and between adjacent optical device structures of the plurality of optical device structures. The encapsulation coating includes a ratio of an encapsulation material to a solvent of about 1:10 to about 1:1. The method further includes forming a plurality of gaps. The plurality of gaps defined by adjacent optical device structures of the plurality of optical device structures, the substrate, and the encapsulation coating. The forming the plurality of gaps includes evaporating the solvent from the encapsulation coating.

In yet another embodiment, a method is provided. The method includes disposing an encapsulation coating over a substrate, over a plurality of optical device structures, and between adjacent optical device structures of the plurality of optical device structures. The encapsulation coating includes a ratio of an encapsulation material to a solvent of about 1:10 to about 1:1. The method further includes forming a plurality of gaps. The plurality of gaps defined by adjacent optical device structures of the plurality of optical device structures, the substrate, and the encapsulation coating. The forming the plurality of gaps includes evaporating the solvent from the encapsulation coating.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein relate to encapsulated optical devices and methods of forming encapsulated optical devices. In one embodiment, a device is provided. The device includes a plurality of optical device structures disposed in or on a substrate. The device further includes an encapsulation coating disposed over the plurality of optical device structures. The encapsulation coating includes a ratio of an encapsulation material to a solvent of about 1:10 to about 1:1. The device further includes a plurality of gaps. The plurality of gaps are defined by adjacent optical device structures of the plurality of optical device structures, the substrate, and the encapsulation coating.

Figure 1A:
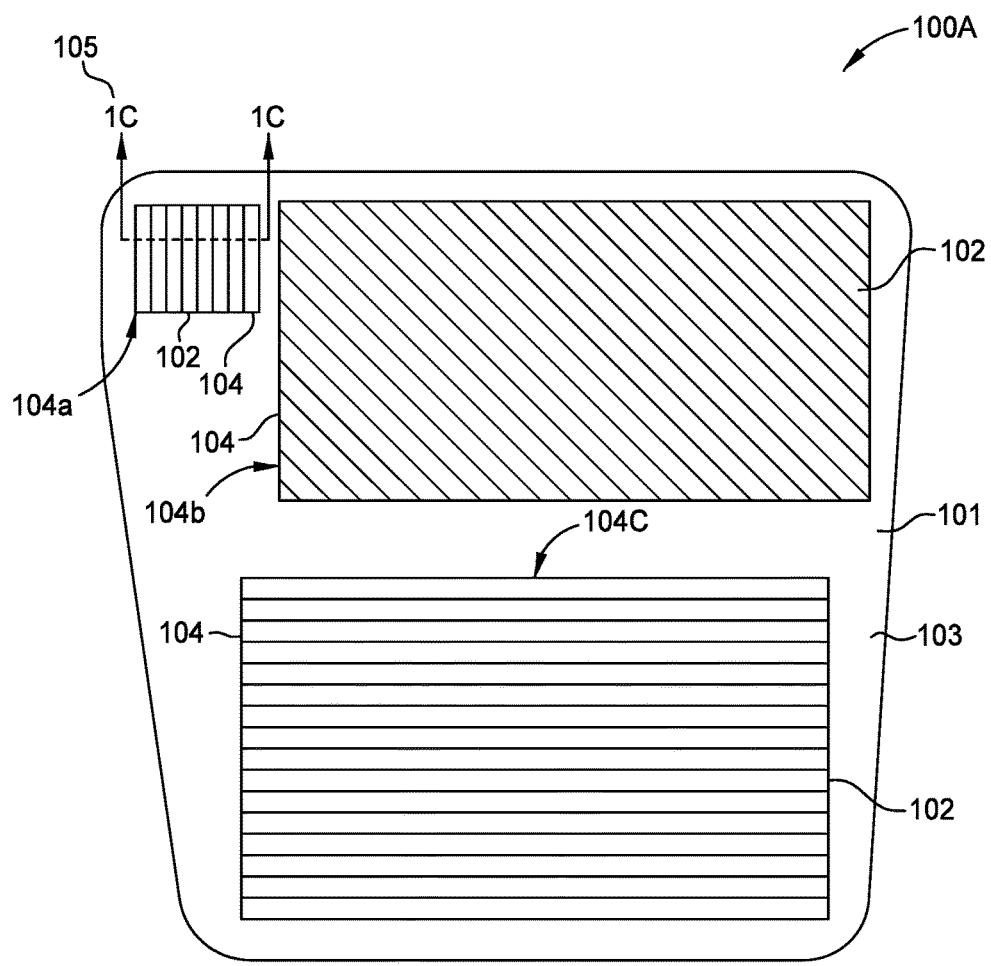
FIG. 1A is a perspective frontal view of an optical device according to embodiments described herein.
Figure 1B:
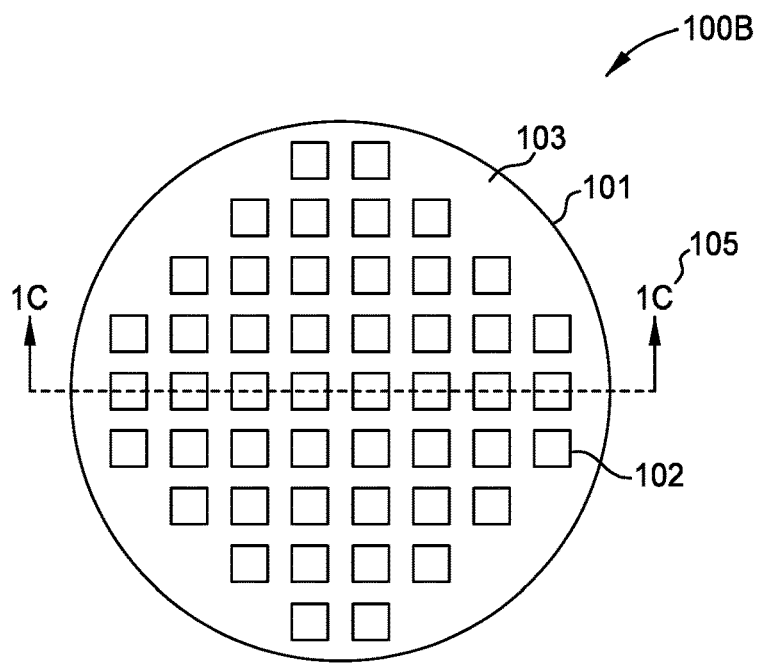
FIG. 1B is schematic top view of an optical device according to embodiments described herein.

FIG. 1A is a perspective, frontal view of an optical device 100A. FIG. 1B is a schematic, top view of an optical device 100B. It is to be understood that the optical devices 100A and 100B described below are exemplary optical devices. In one embodiment, which can be combined with other embodiments described herein, the optical device 100A is a waveguide combiner, such as an augmented reality waveguide combiner. In another embodiment, which can be combined with other embodiments described herein, the optical device 100B is a flat optical device, such as a metasurface. The optical devices 100A and 100B include a plurality of optical device structures 102 disposed on a surface 103 of a substrate 101. The optical device structures 102 may be nanostructures having sub-micron dimensions, e.g., nano-sized dimensions. In one embodiment, which can be combined with other embodiments described herein, regions of the optical device structures 102 correspond to one or more gratings 104, such as a first grating 104a, a second grating 104b, and a third grating 104c. In another embodiment, which can combined with other embodiments described herein, the optical device 100A is a waveguide combiner that includes at least the first grating 104a corresponding to an input coupling grating and the third grating 104c corresponding to an output coupling grating. The waveguide combiner, according to the embodiment, which can be combined with other embodiments described herein, includes the second grating 104b corresponding to an intermediate grating. While FIG. 1B depicts the optical device structures 102 as having square or rectangular shaped cross-sections, the cross-sections of the optical device structures 102 may have other shapes including, but not limited to, circular, triangular, elliptical, regular polygonal, irregular polygonal, and/or irregular shaped cross-sections. In some embodiments, which can be combined with other embodiments described herein, the cross-sections of the plurality of optical device structures 102 have different shaped cross-sections. In other embodiments, which can be combined with other embodiments described herein, the cross-sections of the optical device structures 102 have cross-sections with substantially the same shape.

Figure 1C:
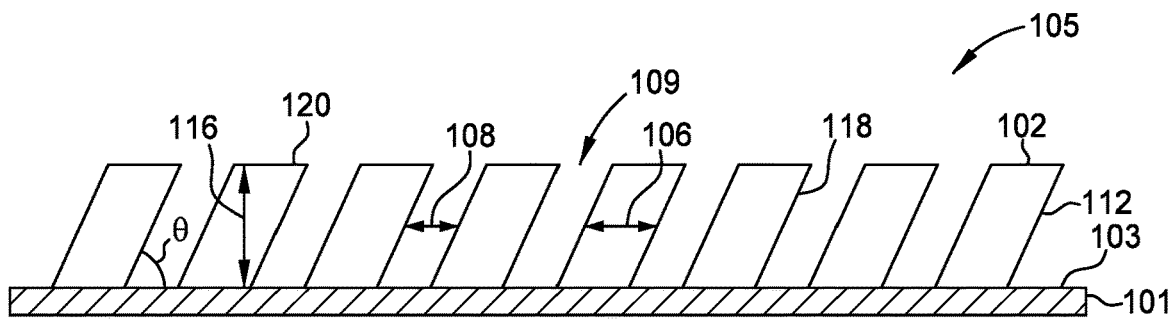
FIG. 1C is a schematic cross-sectional view of a plurality of optical device structures according to embodiments described herein.

FIG. 1C is a schematic cross-sectional view of a plurality of optical device structures 102. FIG. 1C is a portion 105 of the optical device 100A or the optical device 100B. The portion 105 of the optical devices 100A and 100B include the plurality of optical device structures 102 disposed on a surface 103 of a substrate 101. The portion 105 may correspond to one or more gratings 104. Each optical device structure of the plurality of optical device structures 102 has an optical device structure width 106. In one embodiment, which may be combined with other embodiments described herein, the optical device structure width 106 is less than 1 micrometer (μm) and corresponds to the width or the diameter of each optical device structure 102, depending on the cross-section of the optical device structure 102. In one embodiment, which can be combined with other embodiments described herein, at least one optical device structure width 106 may be different from another optical device structure width 106. In another embodiment, which can be combined with other embodiments described herein, each optical device structure width 106 of the plurality of optical device structures 102 is substantially equal to each other.

Each optical device structure 102 of the plurality of optical device structures 102 has a height 116. The height 116 is the distance from the surface 103 of the substrate to a top surface 120 of each optical device structure 102. In one embodiment, which can be combined with other embodiments described herein, at least one height 116 of the plurality of optical device structures 102 is different that the height 116 of the other optical device structures 102. In another embodiment, which can be combined with other embodiments described herein, each height 116 of the plurality of optical device structures 102 is substantially equal to the adjacent optical device structures 102.

The optical device structures 102 are formed from a device material 112. In some embodiments, which can be combined with other embodiments described herein, the device material 112 includes, but is not limited to, one or more of silicon oxycarbide (SiOC), titanium dioxide (TiO$_2$), silicon dioxide (SiO$_2$), vanadium (IV) oxide (VOx), aluminum oxide (Al$_2$O$_3$), aluminum-doped zinc oxide (AZO), indium tin oxide (ITO), tin dioxide (SnO$_2$), zinc oxide (ZnO), tantalum pentoxide (Ta$_2$O$_5$), silicon nitride (Si$_3$N$_4$), zirconium dioxide (ZrO$_2$), niobium oxide (Nb$_2$O$_5$), cadmium stannate (Cd$_2$SnO$_4$), silicon carbon-nitride (SiCN) containing materials, or combinations thereof.

The substrate 101 may also be selected to transmit a suitable amount of light of a desired wavelength or wavelength range, such as one or more wavelengths from about 100 to about 3000 nanometers. Without limitation, in some embodiments, the substrate 101 is configured such that the substrate 101 transmits greater than or equal to about 50% to about 100%, of an infrared to ultraviolet region of the light spectrum. The substrate 101 may be formed from any suitable material, provided that the substrate 101 can adequately transmit light in a desired wavelength or wavelength range and can serve as an adequate support for the optical devices 100A and 1006 described herein. In some embodiments, which can be combined with other embodiments described herein, the material of substrate 101 has a refractive index that is relatively low, as compared to the refractive index of the device material 112. Substrate selection may include substrates of any suitable material, including, but not limited to, amorphous dielectrics, non-amorphous dielectrics, crystalline dielectrics, silicon oxide, polymers, or combinations thereof. In some embodiments, which may be combined with other embodiments described herein, the substrate 101 includes a transparent material. In one embodiment, which may be combined with other embodiments described herein, the substrate 101 is transparent with absorption coefficient smaller than 0.001. Suitable examples may include, but are not limited to, an oxide, sulfide, phosphide, telluride or combinations thereof. In one example, the substrate 101 includes silicon (Si), silicon dioxide (SiO$_2$), germanium (Ge), silicon germanium (SiGe), InP, GaAs, GaN, fused silica, quartz, sapphire, and high-index transparent materials such as glass, or combinations thereof.

The optical device structures 102 include a critical dimension 108, i.e., a linewidth, defined as the distance between adjacent optical device structures 102. As shown in FIG. 1C, the critical dimension 108 of each of the adjacent optical device structure 102 is substantially equal to each other. In some embodiments, which can be combined with other embodiments described herein, at least one critical dimension 108 of adjacent optical device structures 102 is different from the critical dimension 108 of other adjacent optical device structures 102 of the portion 105. An optical device trench 109 is defined by each pair of adjacent optical device structures 102 of the plurality of optical device structures 102 and the surface 103 of the substrate 101. The width of each optical device trench 109 corresponds to the critical dimension 108. The height of each optical device trench 109 corresponds to the height 116 of the adjacent optical device structures 102.

The optical device structures 102 are formed at a device angle ϑ relative to the substrate 101. The device angle ϑ is the angle between the surface 103 of the substrate 101 and a sidewall 118 of the optical device structure 102. In one embodiment, which can be combined with other embodiments described herein, each respective device angle ϑ for each optical device structure 102 is substantially equal throughout the portion 105. In another embodiment, which can be combined with other embodiments described herein, at least one respective device angle ϑ of the plurality of optical device structures 102 is different than another device angle ϑ of the plurality of optical device structures 102.

Figure 2:
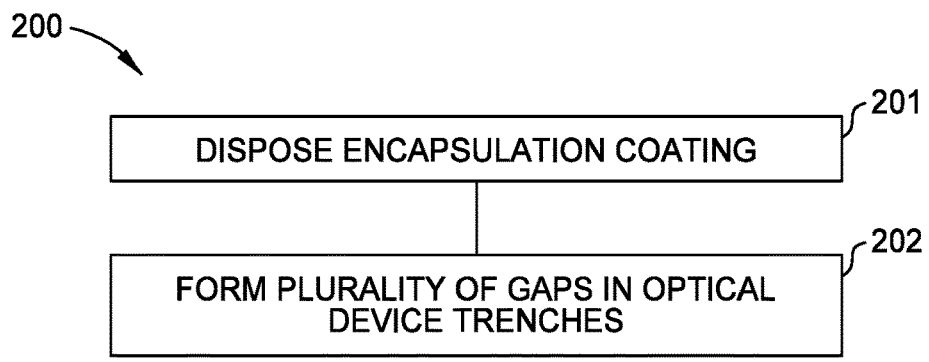
FIG. 2 is a flow diagram of a method of forming an optical device according to embodiments described herein.
Figure 3A:
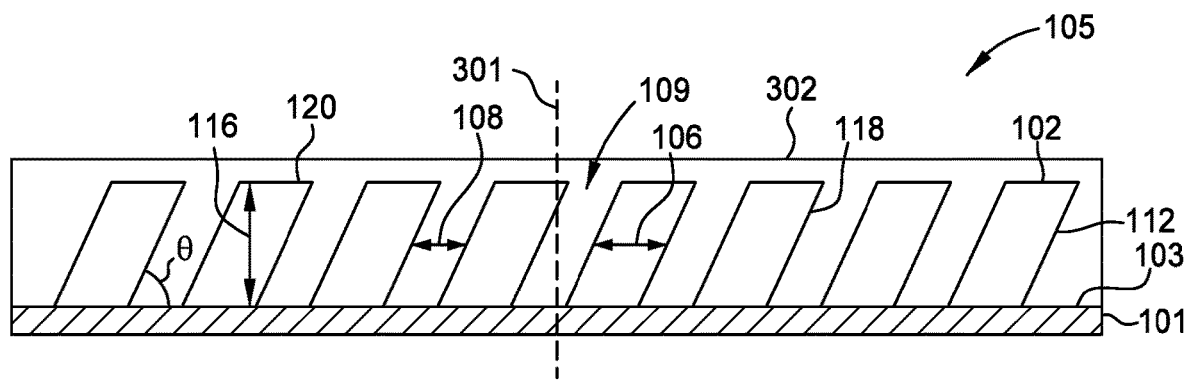
FIGS. 3A and 3B are schematic, cross-sectional views of a substrate during operations of a method of forming an optical device according to embodiments described herein.
Figure 3B:
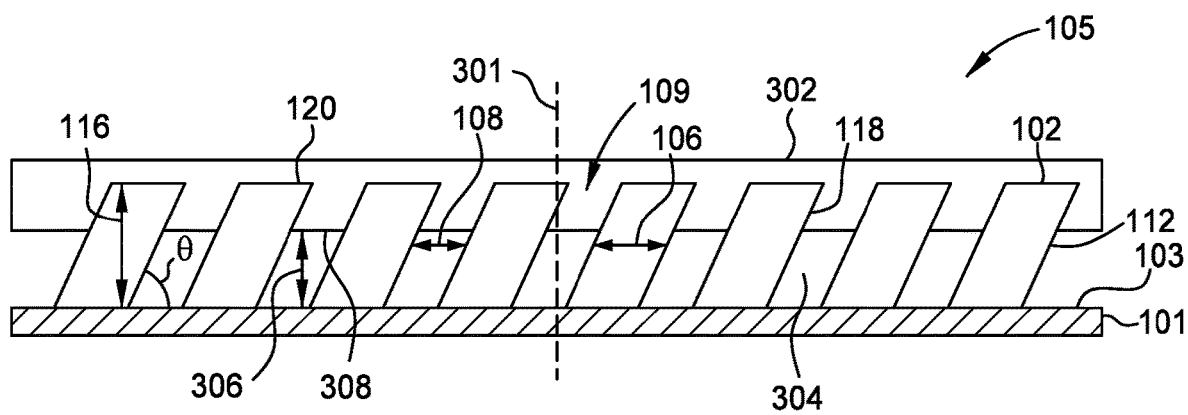

FIG. 2 is a flow diagram of a method 200 for forming an optical device 100A or 100B as shown in FIGS. 3A and 3B. FIGS. 3A and 3B are schematic, cross-sectional views of a substrate during operations of the method 200 of forming an optical device 100A or 100B. FIGS. 3A and 3B are a portion 105 of the optical device 100A or the optical device 100B. The portion 105 of the optical devices 100A and 100B include the plurality of optical device structures 102 disposed on a surface 103 of a substrate 101. In one embodiment, which can be combined with other embodiments described herein, the portion 105 may correspond to a portion or a whole surface of the substrate 101 of a flat optical device. In another embodiment, which can be combined with other embodiments described herein, the portion 105 may correspond to a portion or a whole surface of the substrate 101 of a waveguide combiner.

At operation 201, as shown in FIG. 3A, an encapsulation coating 302 is disposed over the plurality of optical device structures 102. The encapsulation coating 302 is deposited by a spin coating process. The encapsulation coating 302 is a single layer of encapsulation disposed over the plurality of optical device structures 102. The encapsulation coating 302 is operable to fill optical device trenches 109.

The encapsulation coating 302 includes a material composition of an encapsulation material and a solvent. In one embodiment, which can be combined with other embodiments described herein, the encapsulation material may include, but is not limited to, at least one of a material such as spin on glass (SOG), flowable SOG, organic, inorganic, and hybrid (organic and inorganic) materials that may contain at least one of silicon oxycarbide (SiOC), titanium dioxide (TiO2), silicon dioxide (SiO2), vanadium (IV) oxide (VOx), aluminum oxide (Al2O3), indium tin oxide (ITO), zinc oxide (ZnO), tantalum pentoxide (Ta2O5), silicon nitride (Si3N4), titanium nitride (TiN), and zirconium dioxide (ZrO2) containing materials, organic materials such as acrylates, or combinations thereof. In another embodiment, which can be combined with other embodiments described herein, the encapsulation material is an anti-reflective coating material. Examples of the solvent precursor include, but are not limited to, methanol, ethanol, and isopropanol.

The encapsulation coating 302 provides mechanical protection for the plurality of optical device structures 102. Additionally, in embodiments where the encapsulation material is an anti-reflective coating, the anti-reflective coating maximizes light transmission through the optical device 100A or the optical device 100B by reducing reflection of the incident light. In one embodiment, which can be combined with other embodiments described herein, prior to operation 201, a hydrophobic material or hydrophilic material is disposed over the plurality of optical device structures 102 to make the encapsulation coating 302 more or less resistant to filling the optical device trenches 109. An optical device trench 109 is defined by each pair of adjacent optical device structures 102 of the plurality of optical device structures 102 and the surface 103 of the substrate 101.

At operation 202, as shown in FIG. 3B, a plurality of gaps 304 are formed in the optical device trenches 109. The encapsulation coating 302, the plurality of optical device structures 102, and the surface 103 of the substrate 101 define the plurality of gaps 304. Forming the plurality of gaps 304 allows for an increase in throughput as sacrificial material is not needed to be deposited into the optical device trenches 109 in addition to depositing the encapsulation coating 302. It is desirable to have a large contrast between refractive indices of the device material 112 of the plurality of optical device structures 102 and the material of the surrounding structures including the substrate 101, the encapsulation coating 302, and the plurality of gaps 304. Further, air of the plurality of gaps 304 has a refractive index of about 1.0. Thus, it is desirable to form the plurality of gaps 304 including air with a refractive index of about 1.0, such that there is a greater difference of refractive indices present between the device material 112 and the air of the plurality of gaps 304. The difference of refractive indices reduces the thickness of the optical device 100A or the optical device 100B. The reduction of thicknesses provides ease of use, a shorter optical path, less optical distortion, and better image quality of the optical devices. The refractive index of the device material 112 is about 2.0 to about 2.6. The material composition of the encapsulation coating 302 includes a refractive index of about 1.4 to about 2.0. In one embodiment, the difference between the refractive index of the device material 112 and the material composition of the encapsulation coating 302 is about 0.6 to about 1.0. In one embodiment, the difference between the refractive index of the device material 112 and the refractive index of the air in the plurality of gaps 304 is about 1.0 to about 1.6.

A depth 306 is the distance between a lower surface 308 of the encapsulation coating 302 and the surface 103 of the substrate 101. The depth 306 corresponds to the plurality of gaps 304. The depth 306 may be formed by evaporating the solvent of the encapsulation coating 302. Each depth 306 of the plurality of gaps 304 is between about 10% and about 100% of a height 116 of the plurality of optical device structures 102. The depth 306 is between about 0.02 μm and about 1 μm. When the depth 306 is 100% of the height 116, the depth 306 is equal to the height 116 of the optical device structure 102. The depth 306 is operable to be increased or decreased based on different process parameters. The optical device structure width 106 of the plurality of optical device structures 102 and a device angle ϑ of the plurality of optical device structures 102 may be adjusted to increase or decrease the efficiency of the encapsulation coating 302 filling the optical device trenches 109. The optical device structure width 106 is between about 0.1 μm and about 0.5 μm. The device angle ϑ is between about 25 degrees and about 90 degrees.

In one embodiment, which can be combined with other embodiments described herein, during operation 201, the substrate 101 is rotated (i.e., spun) about a central axis 301 of the substrate 101. The rotation rate may be varied during the deposition process. The rotation of the substrate 101 during the deposition of the encapsulation coating 302 may determine the rate at which the encapsulation coating 302 enters the optical device trenches 109. Therefore, the encapsulation coating 302 might not reach the surface 103 of the substrate 101. The rotation rate of the substrate 101 may be increased or decreased to increase or decrease the depth 306. The rotation rate is between about 500 rpm and about 4000 rpm.

The amount of solvent that evaporates is dependent on the concentration of the encapsulation coating 302. The encapsulation coating 302 includes a ratio of the concentration of encapsulation material to the concentration of the solvent. The ratio is between about 1:10 to about 1:1. Increasing the concentration of the solvent to the concentration of the encapsulation material will increase the depth 306 as more solvent is evaporated from the encapsulation coating 302. For example, a second substrate with a second encapsulation coating disposed thereover may be processed. Increasing a concentration of solvent in the second encapsulation coating increases a second depth of a second plurality of gaps relative to the plurality of gaps of the first substrate. Decreasing a concentration of solvent in the second encapsulation coating decreases a second depth of a second plurality of gaps relative to the plurality of gaps of the first substrate.

Additionally, a difference in viscosity between the encapsulation material and the solvent may alter the depth 306. As the difference in viscosity increases, the solvent will move closer to the surface 103 of the substrate 101 in the optical device trenches 109. Therefore, as the plurality of gaps 304 are dependent upon evaporation of the solvent, the difference in viscosity between the encapsulation material and the solvent will alter the depth 306. The viscosity of the encapsulation material is between about 10 centipoise (cP) to about 10,000 cP. The viscosity of the solvent is less than about 10 cP.

In one embodiment, which can be combined with other embodiments described herein, a curing process is performed after the operation 202. The cure process includes exposing the encapsulation coating 302 to electromagnetic radiation, such as infrared (IR) radiation or ultraviolet (UV) radiation. The curing process is performed with a dosage of about 0.05 $J/cm^2$ to about 10 $J/cm^2$. The curing process increases the density of the encapsulation coating 302. In another embodiment which can be combined with other embodiments described herein, a baking process is performed after the operation 202. The baking process occurs at a temperature between about 50° C. and about 200° C. In yet another embodiment, which can be combined with other embodiments described herein, a drying process is performed after the operation 202. The drying process includes, but is not limited to, one or more of supercritical $CO_2$ drying, freeze drying, and pressure drying, such as ambient pressure drying. The drying process may further evaporate the solvent from the encapsulation coating 302. In yet another embodiment, which can be combined with other embodiments described herein, a developing process is performed after the operation 202.

In summation, encapsulated optical devices and methods of forming encapsulated optical devices are described herein. The optical devices include a plurality of optical device structures disposed on a substrate. An encapsulation coating is disposed over the plurality of optical device structures. The encapsulation coating includes a ratio of encapsulation material to solvent. A plurality of gaps are formed in the optical device. The plurality of gaps are defined by the encapsulation coating, the plurality of optical device structures, and the substrate. The plurality of gaps are formed when the solvent is evaporated from the encapsulation coating. The encapsulation coating provides mechanical protection for the plurality of optical device structures as well as maximizing light transmission by reducing reflection of the incident light. The air in the plurality of gaps provide a greater difference in refractive indices within the optical device, improving the performance of the optical device. The material composition of the encapsulation coating, viscosity of the encapsulation coating, the width and device angle of the plurality of optical device structures, as well as process parameters of the spin on coating process, the curing process, the baking process, the drying process, and the developing process will affect the formation of the plurality of gaps and the depth at which the plurality of gaps are formed.

While the foregoing is directed to embodiments of the present disclosure, other and further embodiments of the disclosure may be devised without departing from the basic scope thereof, and the scope thereof is determined by the claims that follow.

What is claimed is:

1. An optical device formed by a method, comprising:
    disposing an encapsulation coating over a first substrate, over a plurality of optical device structures, and between adjacent optical device structures of the plurality of optical device structures, wherein the encapsulation coating fills an entire area between each of the adjacent optical device structures, the encapsulation coating including a material composition with a ratio of an encapsulation material to a solvent of about 1:10 to about 1:1; and
    forming a plurality of gaps, the plurality of gaps defined by the adjacent optical device structures of the plurality of optical device structures, the first substrate, and the encapsulation coating, the forming of the plurality of gaps including evaporating the solvent from the encapsulation coating such that between each of the adjacent optical device structures, the plurality of gaps have a depth from a lower surface of the encapsulation coating to the first substrate.

2. The optical device of claim 1, wherein a difference of a refractive index of a device material of the plurality of optical device structures and a refractive index of the material composition of the encapsulation coating is about 0.6 to about 1.0 and a difference of the refractive index of the device material of the plurality of optical device structures and a refractive index of air disposed in the plurality of gaps is about 1.0 to about 1.6.

3. The optical device of claim 1, wherein the encapsulation coating is an anti-reflective coating layer.

4. A method, comprising:
    disposing a first encapsulation coating over a first substrate, over a plurality of optical device structures, and between adjacent optical device structures of the plurality of optical device structures, wherein the first encapsulation coating fills an entire area between each of the optical device structures, the first encapsulation coating including a material composition with a ratio of an encapsulation material to a solvent of about 1:10 to about 1:1; and
    forming a plurality of gaps, the plurality of gaps defined by the adjacent optical device structures of the plurality of optical device structures, the first substrate, and the first encapsulation coating, the forming of the plurality of gaps including evaporating the solvent from the first encapsulation coating such that between each of the adjacent optical device structures the plurality of gaps have a depth from a lower surface of the first encapsulation coating to the first substrate.

5. The method of claim 4, wherein the depth is between 10% and 100% of a height of each optical device structure.

6. The method of claim 5, further comprising depositing a second encapsulation coating over a second substrate, wherein increasing a concentration of solvent in the second encapsulation coating increases a second depth of a second plurality of gaps relative to the plurality of gaps of the first substrate.

7. The method of claim 5, further comprising depositing a second encapsulation coating over a second substrate, wherein decreasing a concentration of solvent in the second encapsulation coating decreases a second depth of a second plurality of gaps relative to the plurality of gaps of the first substrate.

8. The method of claim 4, further comprising exposing the first encapsulation coating to ultraviolet (UV) radiation in a curing process, the curing process performed with a dosage of about 0.05 J/cm$^2$ to about 10 J/cm$^2$.

9. The method of claim 4, further comprising baking the first encapsulation coating at a temperature between about 50° C. and about 200° C.

10. The method of claim 4, further comprising rotating the first substrate at a rotation rate of between about 500 rpm and about 4000 rpm.

11. The method of claim 4, wherein the first encapsulation coating is an anti-reflective coating layer.

12. The method of claim 4, wherein air disposed in the plurality of gaps has a refractive index of about 1.0, a device material of the plurality of optical device structures has a refractive index between about 2.0 to about 2.6, and the material composition has a refractive index of about 1.4 to about 2.0.

13. The method of claim 4, wherein cross-sections of the plurality of optical device structures include circular, triangular, and elliptical shaped cross-sections.

14. The method of claim 1, further comprising rotating the first substrate at a rotation rate to increase or decrease the depth of the plurality of gaps.

15. The method of claim 14, wherein the rotation rate is between about 500 rpm and about 4000 rpm.

16. The method of claim 1, wherein the encapsulation coating and the solvent have different viscosities.

17. The method of claim 16, wherein a viscosity of the encapsulation coating is between about 10 centipoise (cP) and about 10,000 cP, and a viscosity of the solvent is less than about 10 cP.

18. The method of claim 4, further comprising rotating the first substrate at a rotation rate to increase or decrease the depth of the plurality of gaps.

19. The method of claim 4, wherein the first encapsulation coating and the solvent have different viscosities.

20. The method of claim 19, wherein a viscosity of the first encapsulation coating is between about 10 centipoise (cP) and about 10,000 cP, and a viscosity of the solvent is less than about 10 cP.

* * * * *